S. H. Davis,
Hydrant.
No. 49. Reissued Feb. 4, 1843.
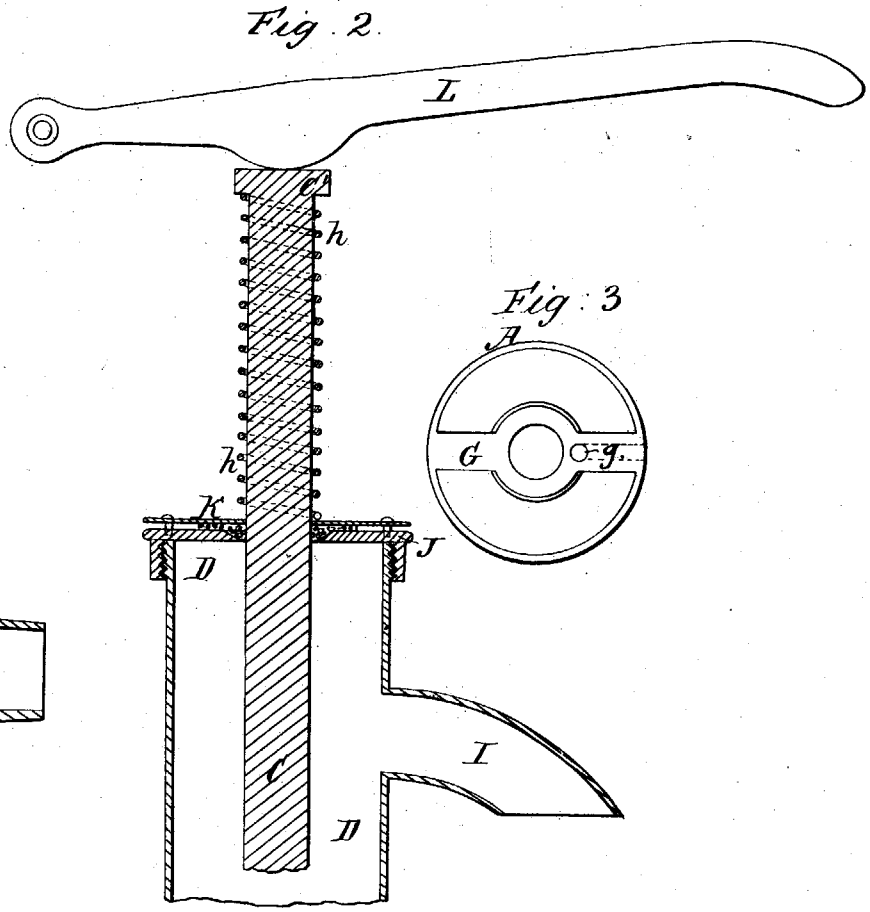
N. PETERS, PHOTO-LITHOGRAPHER, WASHINGTON, D. C.

UNITED STATES PATENT OFFICE.

S. H. DAVIES, OF CINCINNATI, OHIO.

IMPROVEMENT IN HYDRANTS AND FIRE-PLUGS.

Specification forming part of Letters Patent No. 1,702, dated July 18, 1840; Reissue No. 49, dated February 4, 1843.

*To all whom it may concern:*

Be it known that I, S. H. DAVIES, of Cincinnati, in the county of Hamilton and State of Ohio, have invented a new and useful Improvement in Hydraulic Machinery as Applied to Hydrants and Fire-Plugs; and I do hereby declare that the following is a full and exact description thereof.

In the accompanying drawings, Figure 1 represents the valve-box of a hydrant, the same being drawn of a size sufficiently large for private houses. When applied to fire-plugs, it is to be made considerably larger, but it is still to be constructed in the same manner. Fig. 2 is the upper part of a hydrant of the above-named kind, showing the manner in which I sometimes construct this part, but when applied to fire-plugs the manner of opening and closing the valves represented in the figure is not adopted, but is varied so as to adapt it to the intended purpose, as will be presently explained.

A A′ is the valve box or seat, which consists of two parts that are screwed together, as at *a a*. The lower part, A′, has a tube, B, proceeding from it, and by this it is connected to the supply-pipes of the water-works. The lower part, A′, of the valve-box is made fast to the bottom of the wooden or other case which is to surround the ascending tube of the hydrant in the usual way. Every other part of the apparatus, being attached to the upper part, A, of the valve-box, may be readily removed for repair by simply unscrewing it from the lower part. The valve-box is usually placed about three feet below the surface of the ground, where it is out of the reach of frost.

C C is an iron rod which passes up through the ascending tube D D of the hydrant, and this rod has the two valves used by me attached to it at its lower end, while its upper end is to be acted upon in the ordinary way for the purpose of opening or closing the valves.

In the part A of the valve-box there is a rim or perforated diaphragm, E, which may be cast in one piece without, and has an opening through it at *b* sufficiently large to allow the rod C to pass through it and for the water to flow up around said rod. This rim constitutes the lower valve-seat, and is for that purpose made flat and true on its lower side.

F is a valve which, when the rod C is raised, closes the opening *b* and prevents the water from flowing up through the ascending tube of the hydrant. The leather *c* of the valve F may be retained in place by forcing it into a dovetail or undercut groove in the valve-plate *d*, as shown in the drawings.

For the purpose of regulating the discharge of the waste water there is an enlargement or collet on the rod C, as shown at *e*, and on the under side of this collet there is a leather valve, *f*, which, when the rod is forced down, presses on the center of the perforated guide-bar G. Its operation is shown distinctly in Fig. 3, which is a top view of the part A of the valve-box. *g* is a hole drilled so as to pass through the bar G to admit of the escape of waste water, and when the rod C is forced down this hole is closed by the valve *f*, and when it is raised the water flows out freely through the opening *g*.

D D is an ascending tube, of copper or other metal, that is soldered or otherwise fastened at its lower end to the upper segment of the valve-box.

I is a delivery-pipe which is to be placed at such height above the ground as may be necessary to allow a tube or other vessel to be placed under it.

On the upper end of the tube D a cap, J, is shown as screwed, and above this there is a plate, K, both of these being perforated to allow the rod C to pass through them. The top of the cap J is made concave to receive a portion of tow or other packing around the rod, and the plate K, being forced down thereon, forms a kind of stuffing-box that prevents the escape of water. The rod C extends to a suitable height above the cap J, and is surrounded by a spiral spring, *h*, which bears against the plate K and against a button, C′, on the top of the rod, and by its action raises it so as to close the valve F. The force of the spring *h* bearing on the plate K may suffice to keep the packing in place, but said plate may be confined by screws, if preferred.

L is a lever by means of which the rod C may be forced down when water is to be drawn.

This manner of opening and closing the valves so as to draw or stop the water will answer well for small hydrants; but when fire-plugs are constructed, or other apparatus required which are to allow a passage to a large quantity of water, the valves may be opened and closed by means of a screw operating on the upper end of the rod, as in many other fire-plugs and hydrants, there not being anything new in this part of the apparatus.

When hydrants and fire-plugs are constructed in this manner, they may, as above noticed, be taken up for repair and be replaced with the utmost facility, and when the ascending tube, with its appurtenances, has been unscrewed from the lower part of the valve-box the rod C may be removed from the tube by taking off the nut that confines the lower valve and unscrewing the cap J. The case which incloses the ascending tube D should be made in two parts joined together near the surface of the earth, so that the upper portion may be removed while the lower remains permanently fixed in the ground.

Having thus fully described the nature of my invention and shown the operation thereof, what I claim therein as new, and desire to secure by Letters Patent, is—

The manner in which I have combined and arranged the valves and the valve-seats, as set forth—that is to say, I claim the manner of arranging the two valves F and *f* on the rod C, so that when the former, F, is depressed the latter, *f*, will close the waste-water outlet *g*, and when it is raised will leave the said outlet open, the valve-seat A A′ being made in two parts, so that the upper may be unscrewed and removed from the lower in the manner and for the purpose herein fully made known, and this manner of combining and arranging the valves I claim whether the rod C be acted upon by a spring or in any other known way for the purpose of depressing or of raising such rod.

S. H. DAVIES.

Witnesses:
THOS. P. JONES,
M. E. JONES.